UNITED STATES PATENT OFFICE.

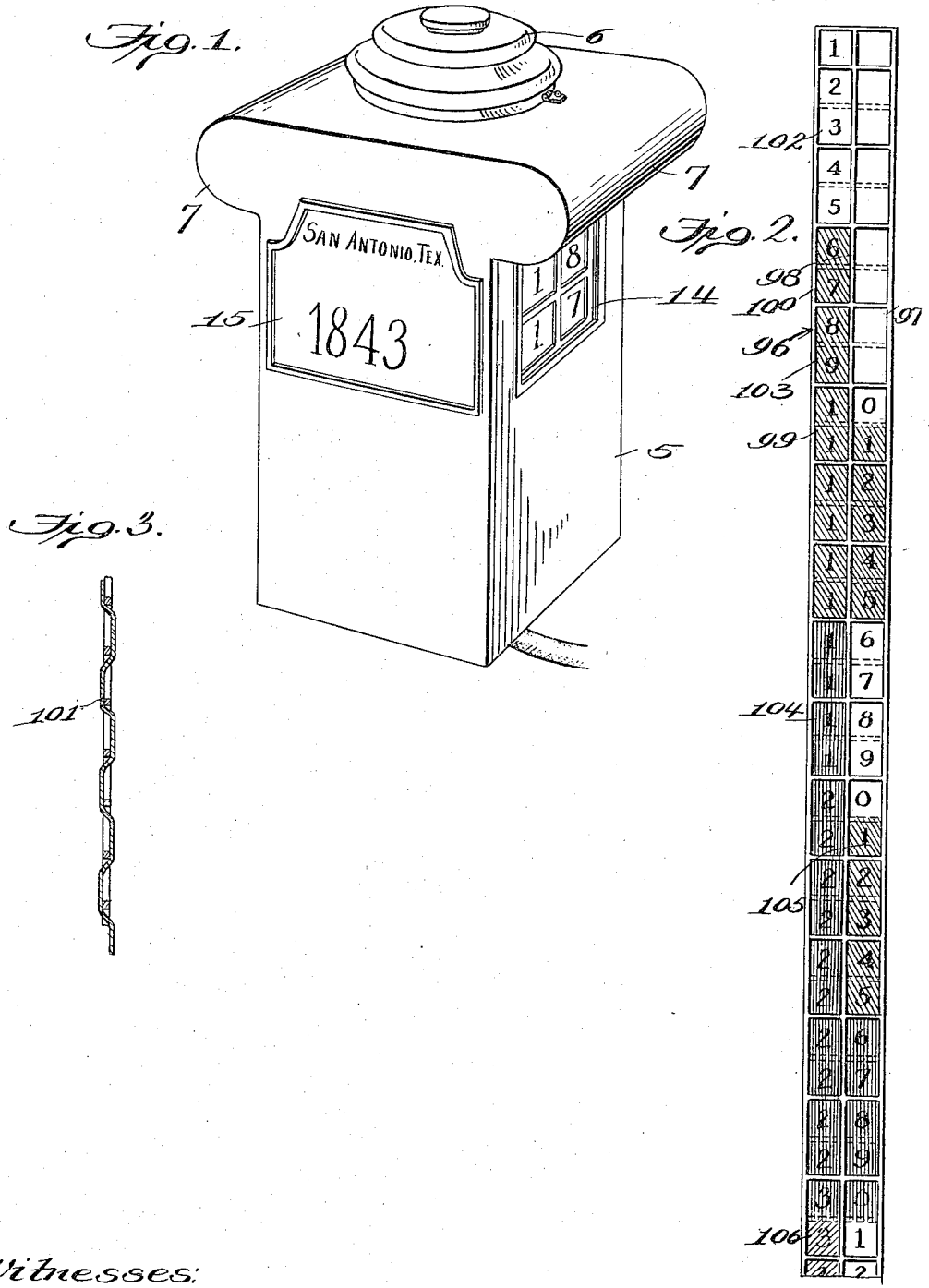

WILLIAM N. ALLAN, OF SAN ANTONIO, TEXAS.

SPEED-INDICATOR.

1,146,913.　　　　Specification of Letters Patent.　　Patented July 20, 1915.

Application filed July 24, 1912. Serial No. 711,319.

*To all whom it may concern:*

Be it known that I, WILLIAM N. ALLAN, a citizen of the United States, residing at San Antonio, in the county of Bexar and State of Texas, have invented new and useful Improvements in Speed-Indicators, of which the following is a specification.

This invention relates to speed indicators for vehicles and especially adapted for automobiles, and the primary object of the invention is to provide means in connection with an indicator that will show by different colored fields as well as by large numbers in the latter the speed of an automobile passing along a street or thoroughfare and enabling the public to readily ascertain the rate of travel of the automobile or other vehicle from either side of the street or thoroughfare, the said means being readily discernible by night through the medium of an illumination or light shining through the fields.

A further object of the invention is to provide a speed indicator which is positive and accurate in its operation and from which the public may readily ascertain the rate at which a vehicle or automobile is traveling at a distance from the latter and without requiring a close inspection of a speedometer or other device ordinarily used and carried within the vehicle or automobile out of view of persons who may be walking or standing on a sidewalk or pavement.

A still further object of the invention is to provide a speed indicator that may be readily applied to a vehicle or automobile and having means in connection therewith whereby the number of the automobile may be fully displayed and readily seen.

With these and other objects and advantages in view the invention consists in the preferred construction and arrangement of parts which will be more fully hereinafter described and claimed.

In the accompanying drawings a preferred embodiment of the invention is disclosed, though it will be understood that changes in the proportions, dimensions and minor details may be resorted to without departing from the spirit of the invention.

In the drawings: Figure 1 is a perspective view of a speed indicator embodying the features of the invention. Fig. 2 is a detail elevation of a portion of one of the indicating tapes or shiftable indicators. Fig. 3 is a cross-section of a portion of the tape or indicator.

The numeral 5 designates a casing which may be of any suitable material, preferably thin sheet metal, and provided with a ventilating top cap 6 of any preferred contour and connected to curved side walls 7 of approximately semicircular form in cross-section and forming seats for a purpose which will be more fully hereinafter explained. The casing will be provided with suitable illuminating means therein, such as a lamp, and at opposite sides of the casing are sight openings covered with glass or other transparent plates 14 constituting windows. The front of the casing also has a transparent plate 15 mounted therein and adapted to receive the number of the machine and location of the owner, and at the back of the casing at this point a third sight opening or window covered by a transparent plate is intended to be provided.

Shiftably or movably mounted within the casing 5 are indicating devices in the form of tapes or webs 94 which are exposed through the sight openings covered by the glass or other transparent plates 14 through which the light is adapted to shine when it is desired to use the speed indicator at night. It is also proposed to use a similar indicating device or tape in connection with the opening at the rear of the casing so that the driver or operator of the vehicle may be apprised of the speed of the vehicle. The glass or transparent plate covered openings 14 will be disposed for view of pedestrians or others passing along the roadway or street where the vehicle equipped with the speed indicator may be running or moving.

Each of the tapes is similar in construction and is of the form shown by Figs. 2 and 3 by preference, though it may be modified at will within the scope of the invention. Each tape consists of a sheet metal body 96 stamped out to form a plurality of openings 97 arranged in parallel pairs and surrounded by the uncut portions of the sheet metal, a central partition strip 98 dividing the openings and from the latter horizontal dividing strips 99 extend to continuous edge strips 100. There are two tape members applied to each body 96, said tape members being formed of suitable fabric, as at 101, and threaded in and outwardly over the horizontal division strips 99 between the strips 98 and 100 and by this means the tapes are firmly attached or held intact with the sheet metal body 96. The tapes are similarly colored in equal sections throughout their length, the tapes at their starting points or extremities being uncolored or white, as at 102, and bearing numerals from "1" to "5" in sequence thereon and indicating that up to five miles the tapes will show white through the sight openings. From "6" to "9" the one tape will be green in color, as at 103, and the same color will be carried through this tape, and the second tape will similarly be colored from "11" to "15," the said second tape down to the cipher being white or uncolored as far as the second figure character or "0" representing 10 miles. The third section beginning with the numeral "16" is differently colored, the tape bearing the tens numeral being red, as at 104, clear through to the indication for thirty miles, whereas the units tape is white from the numeral "6" to the first "0." The next section of the units tape of the distance section 104, which indicates sixteen to thirty miles, is green in color, as at 105, from the numeral "1" to the numeral "5" or up to the numerals indicating twenty-five miles, and the remaining portions of both tapes of section 104 are red. The next distance section 106 starting with thirty-one miles up to forty-five or fifty miles, as the case may be, is differently colored, the tape carrying the tens numerals being purple and the tape carrying the units numerals being white and afterward colored as explained in connection with the distance section 104 except that purple will predominate as the distinguishing color and with which both green and red may be used on the units tape. All of the units and tens numerals on the two tapes will be of a distinguishing character or be shown in black by preference, but it will be understood that any schedule of colors may be used on the tapes other than those above mentioned to represent certain distances.

It will be seen from the foregoing that the tapes indicate the speed of the vehicle or automobile, not only by means of numerals, but through the medium of a predetermined arrangement of colors and uncolored portions of the tapes, the colors showing through the sight openings with distinguishing effect relatively to the numerals and vice versa and rendering the speed readily discernible and easily understood from either side or at the rear of the indicator. It will also be understood that the shiftable indicating devices, tapes or bands will be unrestricted in their movement or have ample clearance relatively to the parts adjacent to which they are mounted, and, furthermore, the said tapes or bands will be held under suitable tension. The portions of the shiftable indicating devices carrying the tapes may have no indicating means whatever thereon at points above and below the sight openings which would never be exposed through the latter, but at their opposite extremities the indicating devices will be suitably secured to drums or spools.

The indicator as a whole is applied to the machine or vehicle so that the glass or transparent plate 15 will stand toward the front with the sight openings 14 at opposite sides and the sight openings that may be disposed at the rear. When the vehicle or machine is in a state of rest the tapes or bands will show no numerals or colors through the sight openings.

The improved indicator will serve as a public safety device by exposing to those adjacent to a vehicle or automobile the speed at which the latter is running and it can thus be readily seen whether the vehicle is running over the speed limit of whatever community or municipality in which it may be traveling. The improved indicating means also may be readily seen by the occupants of the vehicle or automobile and it is obvious that if the speed is excessive it can be easily regulated to run within speed limits, and by this means reckless propulsion or driving can be avoided.

What is claimed is:

1. In a speed indicator, a plurality of uniformly shiftable transparent indicating bands of flexible material movable longitudinally together in parallel relation, the bands carrying differentiating speed indicating media in the form of variously colored positively defined sections and numerals on the sections in a contrasting shade, the colored sections in part being both the same in color and in part differing in color in adjacent sections and the numerals being in part carried by one band alone and in part by both bands, the colored sections and the numerals thereon being arranged in regular succession longitudinally of the bands in accordance with specified speed scales.

2. In a speed indicator, a plurality of uniformly shiftable transparent bands made of flexible material and movable longitudinally and disposed in parallel relation in the same plane relatively to each other, the bands moving together and having differentiating speed media thereon in the form of succeeding color sections with numerals on the colors in a contrasting shade, the colors being arranged in sections on the bands and being both the same and varying in adjacent sections transversely of the bands and in part consisting of a single row of sections of a uniform shade and in part a double row of colored sections which are both the same in shade and also differing in shade.

In testimony whereof I have hereunto set my hand in presence of two subscribing witnesses.

WILLIAM N. ALLAN.

Witnesses:
CHAS. A. ROWE,
CHAS. S. HYER.

Copies of this patent may be obtained for five cents each, by addressing the "Commissioner of Patents. Washington, D. C."